US012398558B2

(12) United States Patent
Venkatesan et al.

(10) Patent No.: US 12,398,558 B2
(45) Date of Patent: *Aug. 26, 2025

(54) FLOATING CONNECTION FASTENING SYSTEM

(71) Applicant: OMG Building Products LLC, Agawam, MA (US)

(72) Inventors: Arun Srinivasan Venkatesan, Feeding Hills, MA (US); Timothy F. Gillis, Florence, MA (US); Frederick A. Enko, Westfield, MA (US); Mark A. Dicaire, Boylston, MA (US)

(73) Assignee: OMG Building Products LLC, Agawam, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,400

(22) Filed: Sep. 25, 2023

(65) Prior Publication Data
US 2024/0011287 A1  Jan. 11, 2024

Related U.S. Application Data

(63) Continuation of application No. 16/519,388, filed on Jul. 23, 2019, now Pat. No. 11,808,034.
(Continued)

(51) Int. Cl.
E04B 2/82 (2006.01)
F16B 5/02 (2006.01)
F16B 25/00 (2006.01)

(52) U.S. Cl.
CPC .............. E04B 2/82 (2013.01); F16B 5/0275 (2013.01); F16B 25/0063 (2013.01)

(58) Field of Classification Search
CPC .... E04B 2/82; E04B 2/825; E04B 2001/2652; F16B 25/0083; F16B 5/0283; F16B 5/0275; F16B 25/0063; F16B 5/0241; F16B 43/005; F16B 43/00; F16B 19/02; F16B 35/048; F16B 25/0031
USPC .... 411/21, 25, 42, 60.2, 378, 533, 546, 528, 411/531; 52/285.2, 506.5, 506.05; 81/44, 451–458
See application file for complete search history.

(56) References Cited

U.S. PATENT DOCUMENTS 1,099,668 A   6/1914 Rosenberg
1,119,843 A  12/1914 Law
(Continued)

FOREIGN PATENT DOCUMENTS

EP  0292742 A1 * 11/1988
EP  2868855 A1    5/2015
EP  3667107 A1 *  6/2020  ........... B25B 15/005

Primary Examiner — Kristina R Fulton
Assistant Examiner — Jock Wong
(74) Attorney, Agent, or Firm — Alix, Yale & Ristas, LLP

(57) ABSTRACT

A floating connection fastening system employs a semi-flexible floating bushing having a sleeve with an axial slot which captures a fastener having a head, an unthreaded shank portion, a threaded portion and an intermediate reamer. An adapter mounts to the bushing/fastener assembly and receives a driver bit. The adapter defines an offset clearance. The floating connection is installed by driving the fastener through a non-load bearing member so as to form a bore and embed the fastener into a load bearing member. The floating bushing has a flange which engages the surface of the non-load bearing member. The installation may be performed in essentially a one-step procedure.

29 Claims, 11 Drawing Sheets

Related U.S. Application Data

(60) Provisional application No. 62/815,546, filed on Mar. 8, 2019.

(56) References Cited

U.S. PATENT DOCUMENTS

| | | | |
|---|---|---|---|
| 3,869,216 A | 3/1975 | Cseke | |
| 3,881,293 A | 5/1975 | Conville | |
| 4,486,134 A * | 12/1984 | White | F16B 5/0283 |
| | | | 411/383 |
| 4,862,556 A | 9/1989 | Grass | |
| 4,902,179 A | 2/1990 | Harker | |
| 5,906,080 A | 5/1999 | diGirolamo et al. | |
| 5,987,837 A * | 11/1999 | Nelson | F16B 25/0089 |
| | | | 52/404.2 |
| 5,997,229 A | 12/1999 | Akers | |
| 6,155,145 A * | 12/2000 | Oh | B25B 23/10 |
| | | | 81/125 |
| 6,196,778 B1 | 3/2001 | Wakai | |
| 6,360,842 B1 | 3/2002 | Combest | |
| 6,582,171 B2 | 6/2003 | Bondarowicz et al. | |
| 6,595,733 B1 | 7/2003 | Willert | |
| 6,623,492 B1 | 9/2003 | Berube et al. | |
| 7,828,502 B2 | 11/2010 | Chretien et al. | |
| 8,210,784 B2 | 7/2012 | Hartmann | |
| 8,262,330 B2 | 9/2012 | Ishino et al. | |
| 8,458,972 B1 * | 6/2013 | Stodola | E04B 2/825 |
| | | | 52/284 |
| 8,828,067 B2 | 9/2014 | Tipirneni et al. | |
| 9,017,329 B2 | 4/2015 | Tyber et al. | |
| 9,360,032 B2 | 6/2016 | Dicaire | |
| 10,228,012 B2 * | 3/2019 | Holt | F16B 41/002 |
| 2003/0077118 A1 | 4/2003 | Kobusch et al. | |
| 2005/0008449 A1 | 1/2005 | Horita | |
| 2007/0122253 A1 | 5/2007 | Murtha | |
| 2008/0226420 A1 | 9/2008 | Huang | |
| 2010/0239387 A1 * | 9/2010 | Gray | E04B 1/2608 |
| | | | 411/531 |
| 2011/0229285 A1 | 9/2011 | Fluckiger | |
| 2012/0017529 A1 | 1/2012 | Shadwell et al. | |
| 2015/0336246 A1 * | 11/2015 | Peters | H01F 7/02 |
| | | | 81/439 |
| 2018/0100532 A1 | 4/2018 | Mugan | |

* cited by examiner

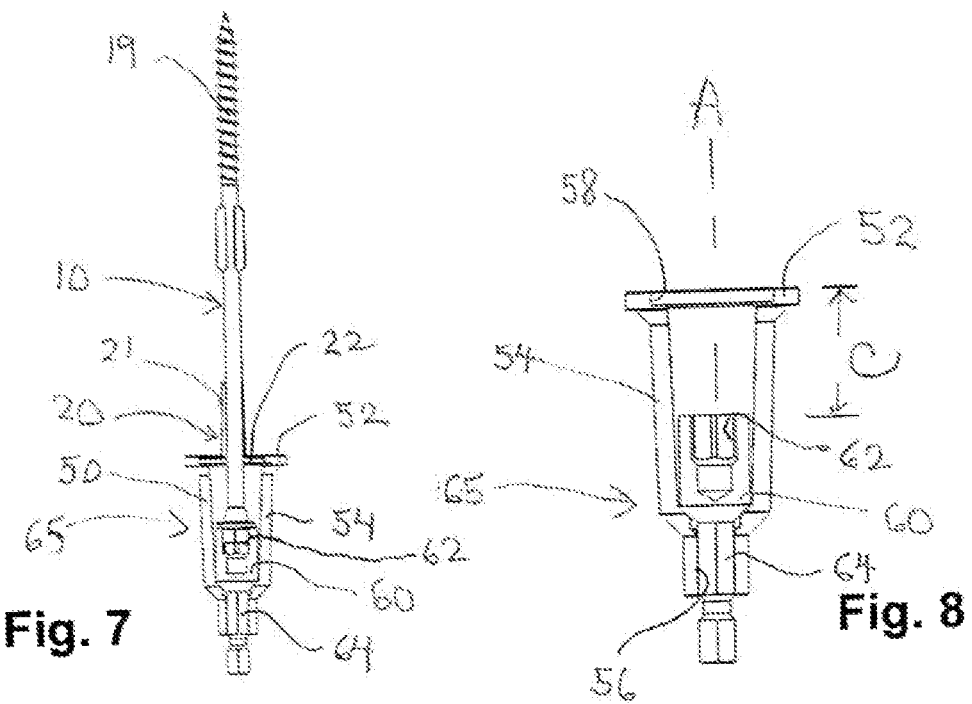
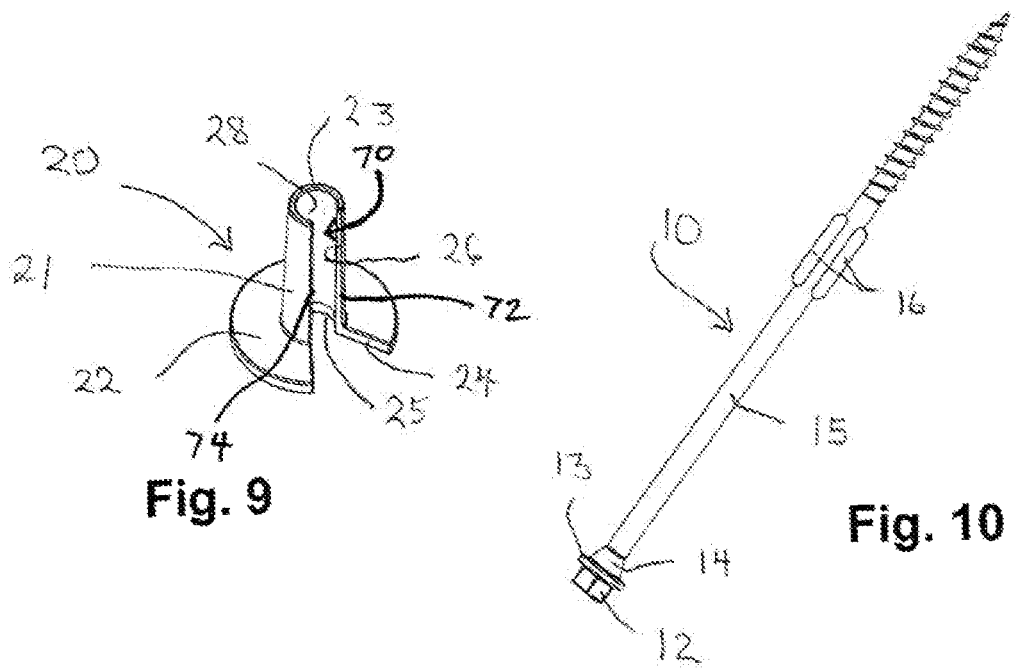

FLOATING CONNECTION FASTENING SYSTEM

CROSS-REFERENCE TO RELATED APPLICATION

This application is a continuation of U.S. patent application Ser. No. 16/519,388, filed on Jul. 23, 2019, for Floating Connection Fastening System, which claims the priority of U.S. Provisional Patent Application No. 62/815,546, filed on Mar. 8, 2019, the entire contents of which is incorporated herein by reference.

BACKGROUND

This disclosure relates generally to devices and techniques for implementing a floating connection. More particularly, this disclosure relates to fastening systems which employ a floating connection to secure a non-load bearing wall to a truss or load bearing structure.

In some construction techniques, interior non-load bearing walls are typically framed approximately 1½ inch to ¾ inch below the load bearing components, such as, for example, floor joists, floor trusses, roof trusses, etc. The gap allows the load bearing components to deflect under pre-designed loads. The non-load bearing wall still requires bracing against lateral movement which is the principal objective of fastening between the non-load bearing wall and the truss or load bearing structures.

It is a well-known characteristic that if the non-load bearing walls are built flush to the underside of the load bearing components, the walls potentially become load bearing or quasi-load bearing. Such characteristics result in the transfer of load to structural components which, over time, typically result in dips in floors, cracking of finished work and failure of various components.

It is also possible that the load bearing structure may deflect upwardly relative to a partition wall. In the latter instance, the wall may be displaced upwardly or otherwise displaced. Consequently, for many installations, it is desired to implement a floating connection between a non-load bearing wall and a load bearing member by both creating a gap between the top of the non-load bearing wall and the underside of the load bearing member and/or creating a gap at the underside of the wall top plate between the head or flange of the fastener and the underside of the top plate so that, upon driving, the fastener sits proud relative to the bottom of the top plate.

As used herein, the phrase "floating connection" refers to a connection which accommodates relative vertical movement between connected structures, but limits movement in the lateral and transverse direction.

One technique for implementing a floating connection between a generally vertical non-load bearing wall and a generally horizontal load bearing wall involves usage of a specially configured fastener. One such representative fastener has a head with a flange-like tapered underside and a shank which has a non-threaded axially extended portion adjacent the flange. The unthreaded portion has a slip surface or Teflon™-like coating to facilitate sliding along the unthreaded portion. The fastener has an intermediate knurl and a threaded portion at the distal end. The head and flange have a diameter which is greater than the unthreaded portion. Upon driving the fastener in the top plate assembly of the non-load bearing interior wall, the knurl forms a bore which is equal to or slightly greater than the diameter of the unthreaded portion of the fastener. The fastener is driven into the truss or support member so that the thread engages into the support member and the head only engages against the underside of the top plate or projects below the underside of the top plate to form a slight gap which is typically on the order of ½ to ¾ inches. The unthreaded portion of the fastener thus slides in the bore relative to the non-load bearing member.

U.S. Pat. No. 9,360,032 discloses a fastener assembly specifically configured to connect a non-load bearing wall to a truss. The fastener assembly comprises a fastener which has a head and an axially extending shank which has an unthreaded shank portion and a threaded shank portion adjacent the distal end. A sleeve is retained on the fastener and disposed about the unthreaded shank portion. The sleeve is axially displaceable or slidable along the unthreaded shank portion. The sleeve is typically a plastic member with one end engageable against the upper end of the threaded portion and the other end engageable against a flange or a tapered neck disposed adjacent the head.

The unthreaded shank portion extends an axial length which is greater than the longitudinal length of the sleeve. The disclosed fastener assembly of U.S. Pat. No. 9,360,032 is employed for implementing a floating connection between a non-load bearing wall and a load bearing component.

It should be appreciated that the floating connection for all installations is replicated numerous times to complete the installation.

The present disclosure involves a fastening system for efficiently implementing a floating connection between a non-load bearing member and a load bearing member to provide a reliable and durable floating connection.

SUMMARY

In one embodiment, a floating connection installation system includes an adapter, a fastener and a bushing. The adapter has an offset enclosure defining a central first axis, and a proximal opening. A coaxial driving bit extends through the adapter at least partially into the enclosure. A distal reference flange of the adapter defines an abutment surface. The fastener has an elongate shank extending from an enlarged head, and the shank has threading on at least a portion thereof. The bushing includes a sleeve defining a second central axis and is mounted on the fastener coaxial thereto. The bushing also has a proximal locating flange disposed about the second central axis and a distal opening. The adapter bit is engageable with the head of the fastener in a driving position. Driving the fastener into a first building member bores a hole through the first building member and embeds the fastener into a second building member with the sleeve within the hole bored in the first building member.

In another embodiment, a method of installing a floating connection between a load bearing member and a non-load bearing member includes first providing an adapter with a central driver bit and a distal reference surface defining an offset clearance. The driver bit is engaged with a head of a fastener that is mounted by a bushing having a sleeve. The fastener is driven with the bit, which thereby forms a bore in the non-load bearing member and threads a distal portion of the fastener into a load bearing member with the sleeve of the bushing received in the bore.

In yet another embodiment, a method of installing a floating connection between a load bearing member and a non-load bearing member includes providing a composite fastener with an elongate shank having threading and a distal head. A bushing with a proximal sleeve and distal flange is mounted on the shank. An installation tool with an axial bit extending through a central proximal opening in a collar is provided. The collar extends to a proximal reference end. The composite fastener is engaged with the installation tool by engaging the head of the fastener with the bit. The installation tool and fastener are rotatably locked and the bushing is rotatable relative to each of the installation tool and fastener. The fastener is driven through a non-load bearing member until the proximal reference end abuts a surface of the non-load bearing member with the fastener threadedly embedded into the load bearing member and the proximal sleeve within the bore.

The adapter opening has a polygonal axially extending shape. A driver bit is received in the adapter and extends through the opening to define an offset clearance relative to the reference flange.

A preferred fastener has a head, an unthreaded portion, a reamer and a distal threaded portion.

In some embodiments, the fastener is driven to a proud position offset or spaced from the non-load bearing member pre-established by the adapter.

In one embodiment, the slot extends entirely through the bushing to define a notch in the locating flange and the adapter has a key engageable in the floating sleeve notch.

In some embodiments, when the locating flange is received in a coupling recess of a reference flange in the bushing, the reference flange and the locating flange have coplanar surfaces.

BRIEF DESCRIPTION OF THE DRAWINGS

FIG. 7 is a central sectional view of the floating connection assembly of FIG. 1;

FIG. 8 is an enlarged sectional view of the driver attachment assembly of FIG. 7;

FIG. 9 is an enlarged perspective view of the floating bushing of FIG. 7;

FIG. 10 is an enlarged perspective view of the fastener of FIG. 7;

DETAILED DESCRIPTION

Figure 1:
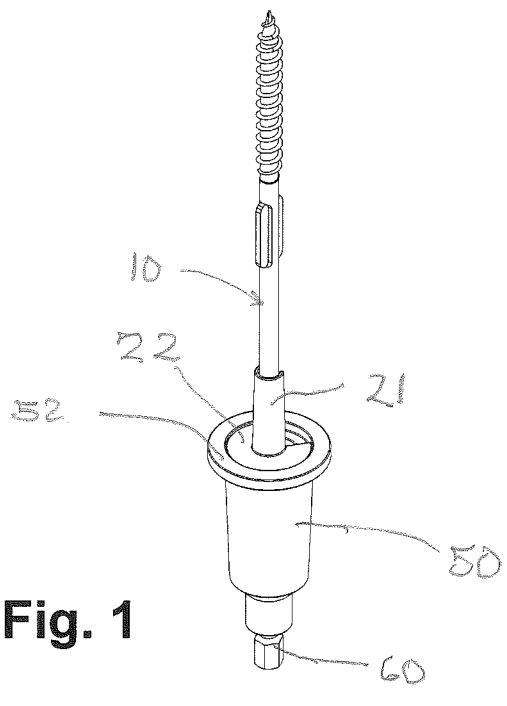
FIG. 1 is a perspective view of a floating connection assembly comprising a fastener, a floating bushing and a driver attachment assembly in engaged relationship.
Figure 2:
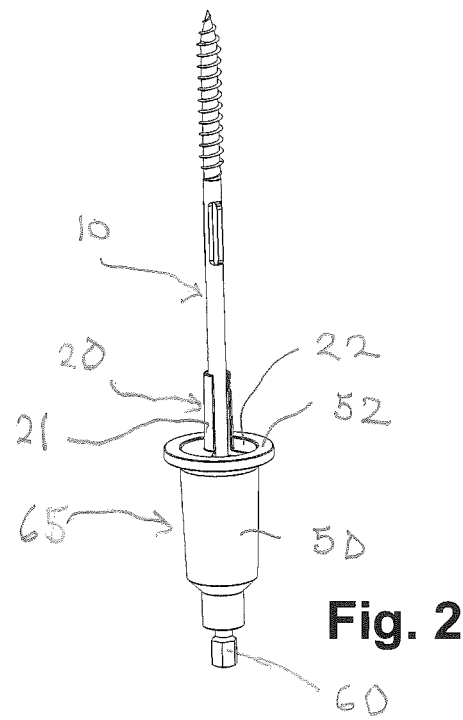
FIG. 2 is a second perspective view of the floating connection assembly of FIG. 1.
Figure 3:
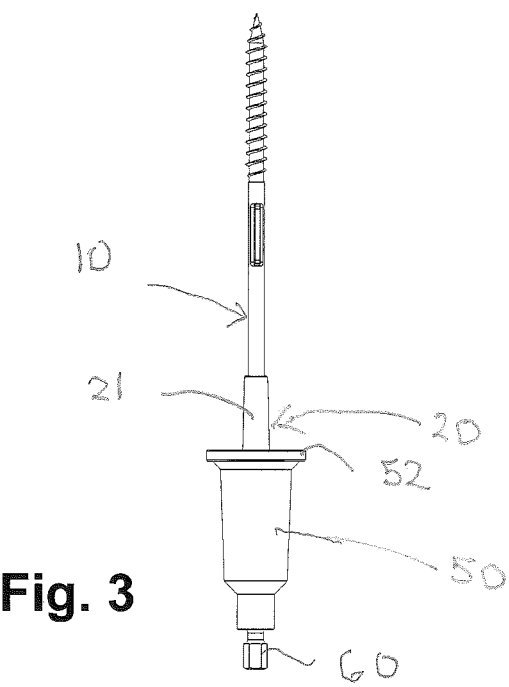
FIG. 3 is an elevational view of the floating connection assembly of FIG. 1.
Figure 4:
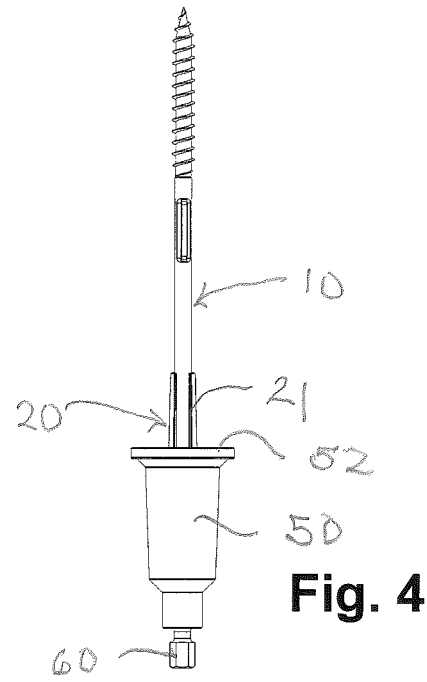
FIG. 4 is an opposite elevational view of the floating connection assembly of FIG. 3.
Figure 5:
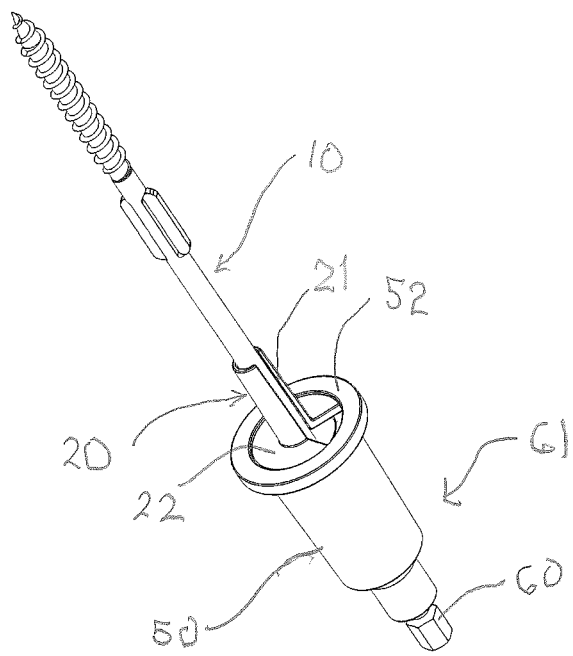
FIG. 5 is a third perspective view of the floating connection assembly of FIG. 1.

With reference to the drawings wherein like numerals represent like parts throughout the several figures, a floating connection fastening system employs a fastener 10, a floating bushing 20 (FIG. 9) or 30 (FIG. 19) mounted to or capturing the fastener, and a driver offset adapter 50 which mounts a driver bit 60 and receives the fastener/sleeve assembly. A driver 70 (FIG. 11) has a chuck which engages the driver bit and rotatably drives the fastener. The principal innovative components are the floating bushings 20, 30 and the cooperating adapter 50. As described herein, "upper" and "lower" refer to preferred installation orientations for descriptive purposes and should not be deemed limiting.

Figure 6:
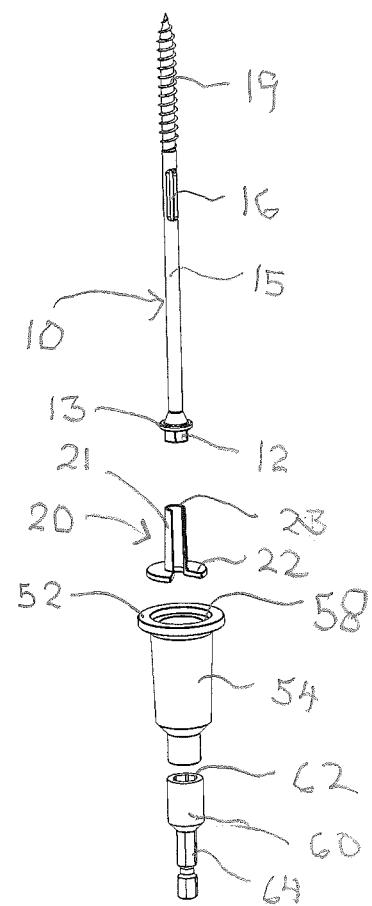
FIG. 6 is an exploded perspective view of the floating connection assembly of FIG. 5.

With additional reference to FIGS. 6 and 10, the connection system is described in terms of a representative preferred fastener 10 configured to form a bore and to connect a non-load bearing member to a load bearing member. The fastener 10 preferably has a six inch axial length which includes a hex head 12 and an integral retaining washer or a flange 13 adjacent a tapered frusto-conical neck 14. Other head, retainer flange/neck configurations are possible. An unthreaded cylindrical shank portion 15 axially extends approximately 4 inches from the neck 14. A threaded portion 18 extends to a threaded distal tip 19. The fastener preferably has an intermediate reamer 16 having diametrically protruding bore forming blades. In a preferred embodiment, the maximum diameter of the head 12 and the unthreaded portion 15 are 0.26 inches and 0.020 inches, respectively. The major diameters of the reamer 16 and threaded portion 18 are 0.24 inches and 0.26 inches, respectively. Naturally, other fastener configurations which have an unthreaded shank portion and have different dimensions are possible.

A slidable bushing 20 or 30 is configured to mount onto and surround the unthreaded shank portion 15 of the fastener to thereby capture the fastener prior to installation. The bushing 20 or 30 essentially functions to axially slide relative to the unthreaded shank portion 15 which, post installation, may axially move. Each bushing 20, 30 is preferably formed from plastic and has a semi-flexible sleeve 21, 31 which extends approximately ⅞ to one inch with an outer diameter less than the outside diameter of the head flange 13. Each sleeve 21, 31 in a normal non-flexed condition has an inner diameter greater than the diameter of the unthreaded portion 15 and less than the maximum diameters of the flange 13 and reamer 16. The bushing 20 or 30 axially retains the fastener by the opposed sleeve ends 23, 25 or 33, 35, respectively engaging the reamer 16 and the flange 13 and/or the neck 14.

Figure 11:
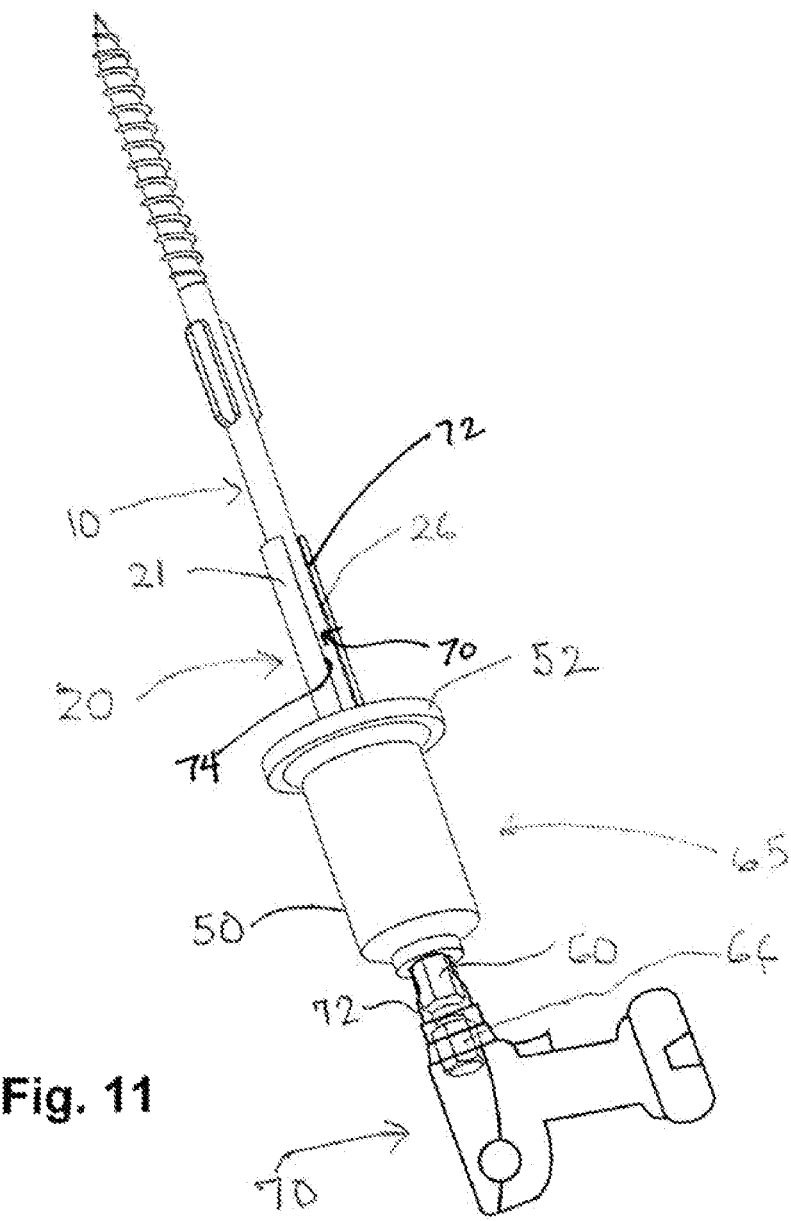
FIG. 11 is a perspective view, partly broken away and partly representational, of a driver, an attachment assembly, a fastener and a floating bushing in assembled driving relationship.
Figure 12:
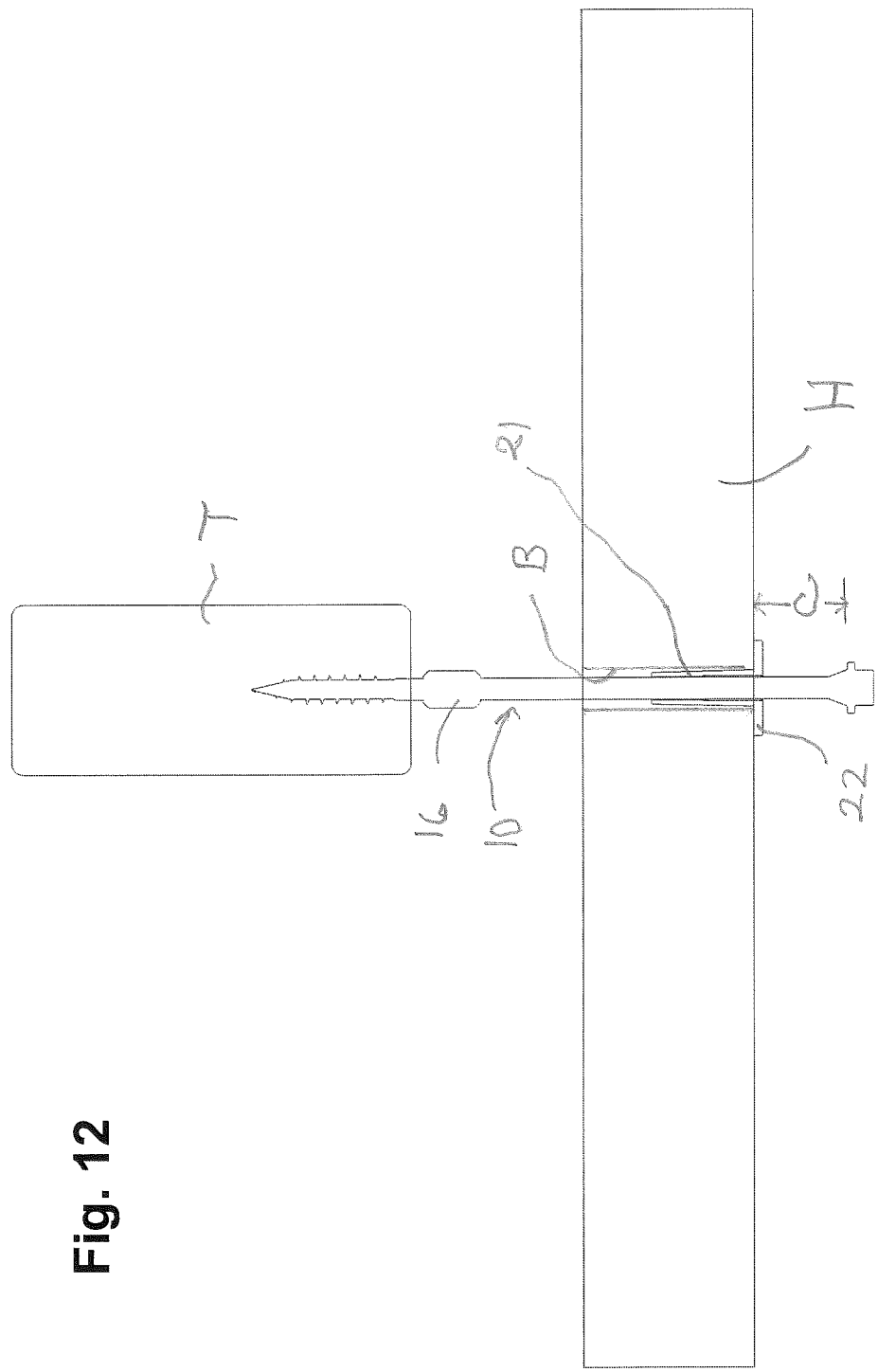
FIG. 12 is a representational sectional view of an installed floating connection.
Figure 13:
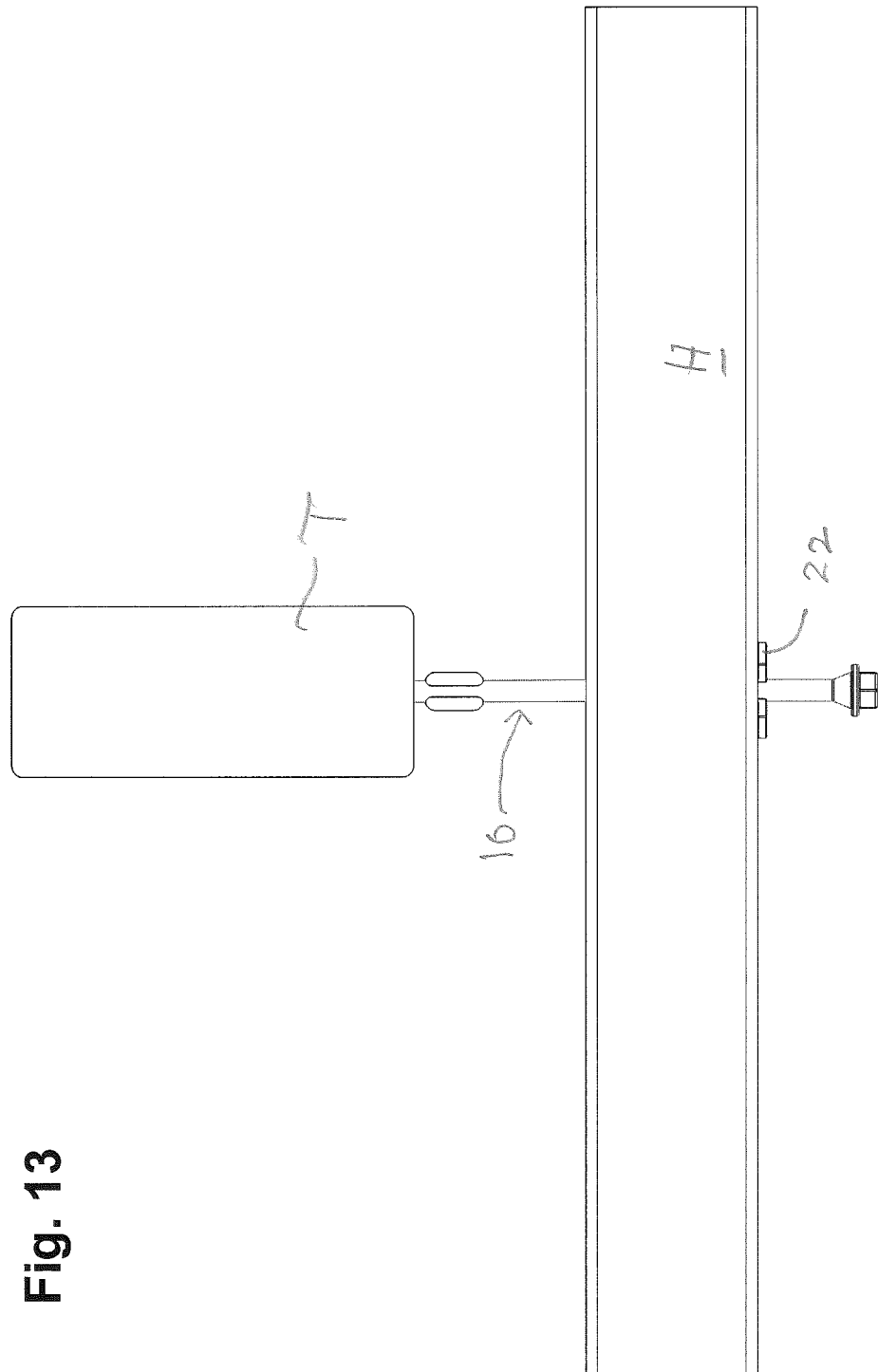
FIG. 13 is a representational elevational view of the installed floating connection of FIG. 12.
Figure 14:
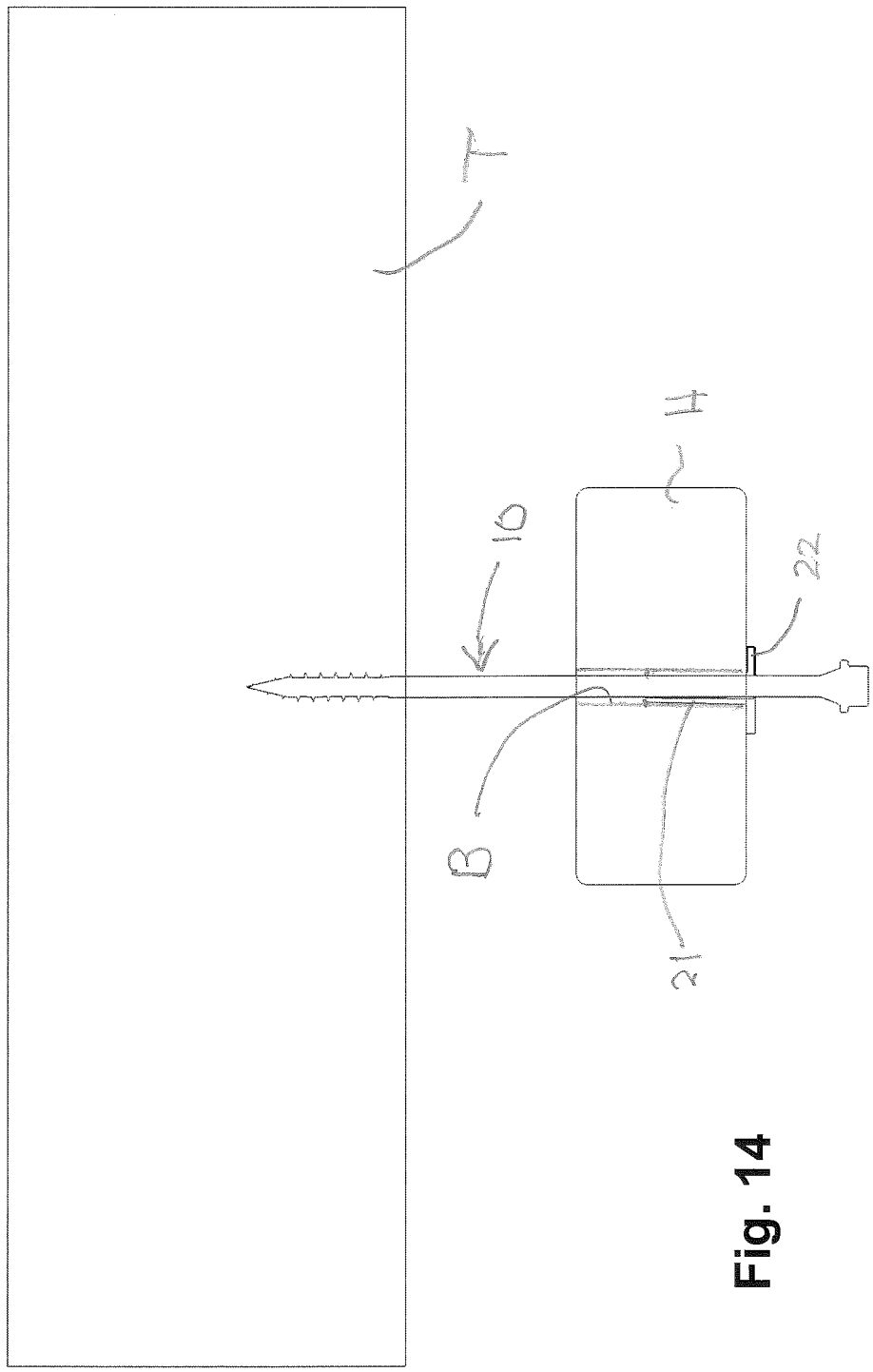
FIG. 14 is a representational sectional view of the installed floating connection of FIG. 12 from a 90° perspective thereof.
Figure 15:
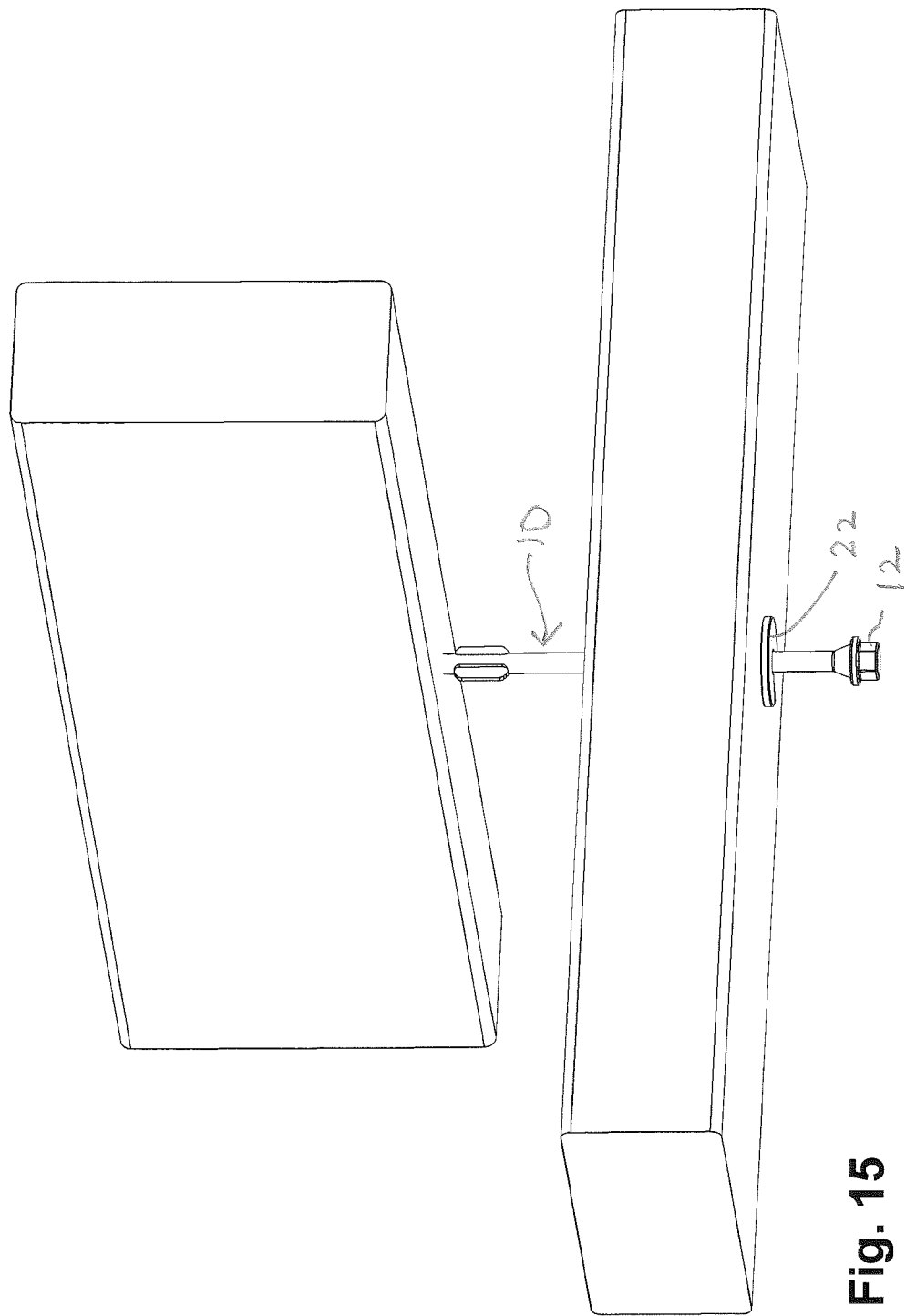
FIG. 15 is a perspective view of the floating connection of FIG. 12.
Figure 16:
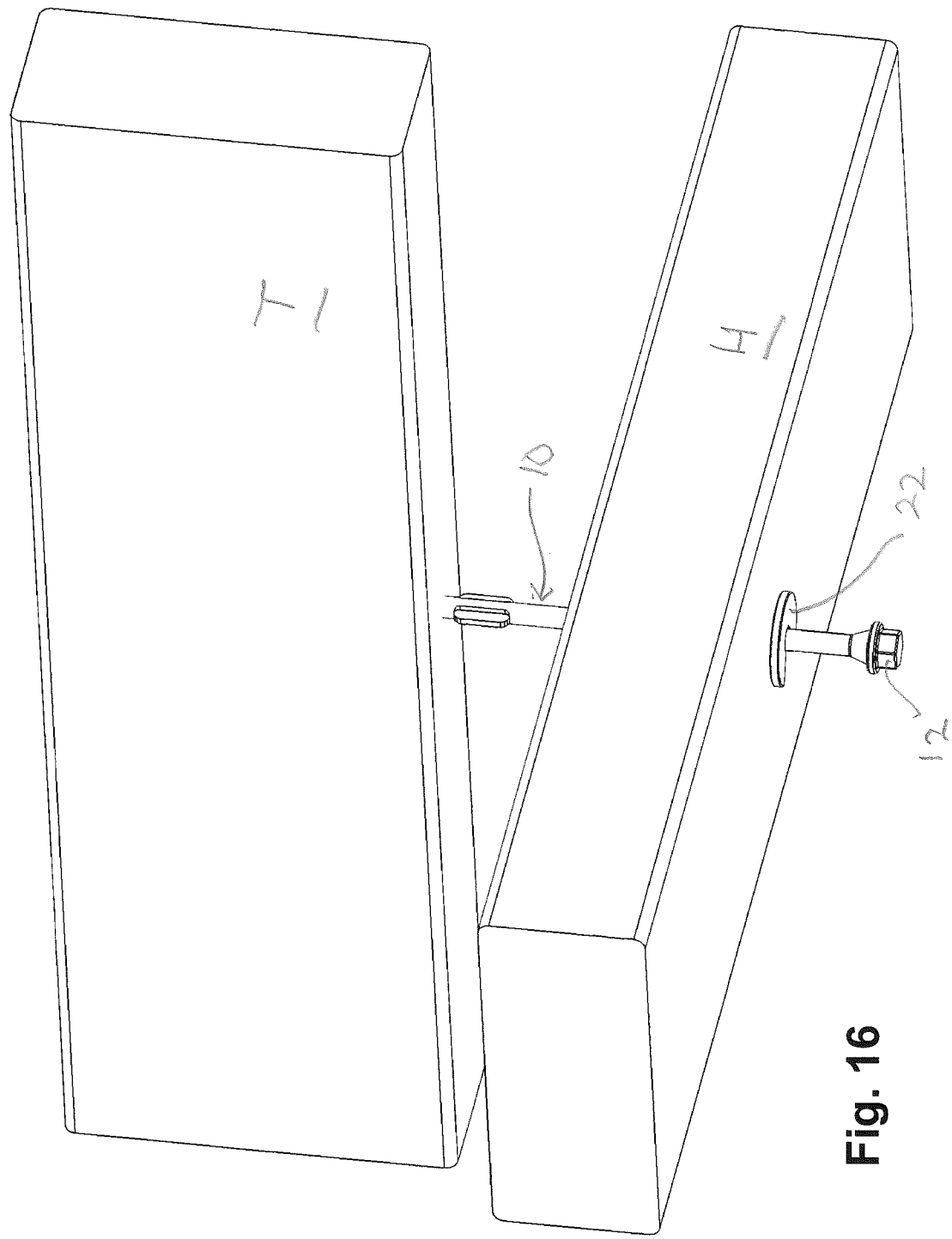
FIG. 16 is a second perspective view of the installed floating connection of FIG. 15.
Figures 17, 18:
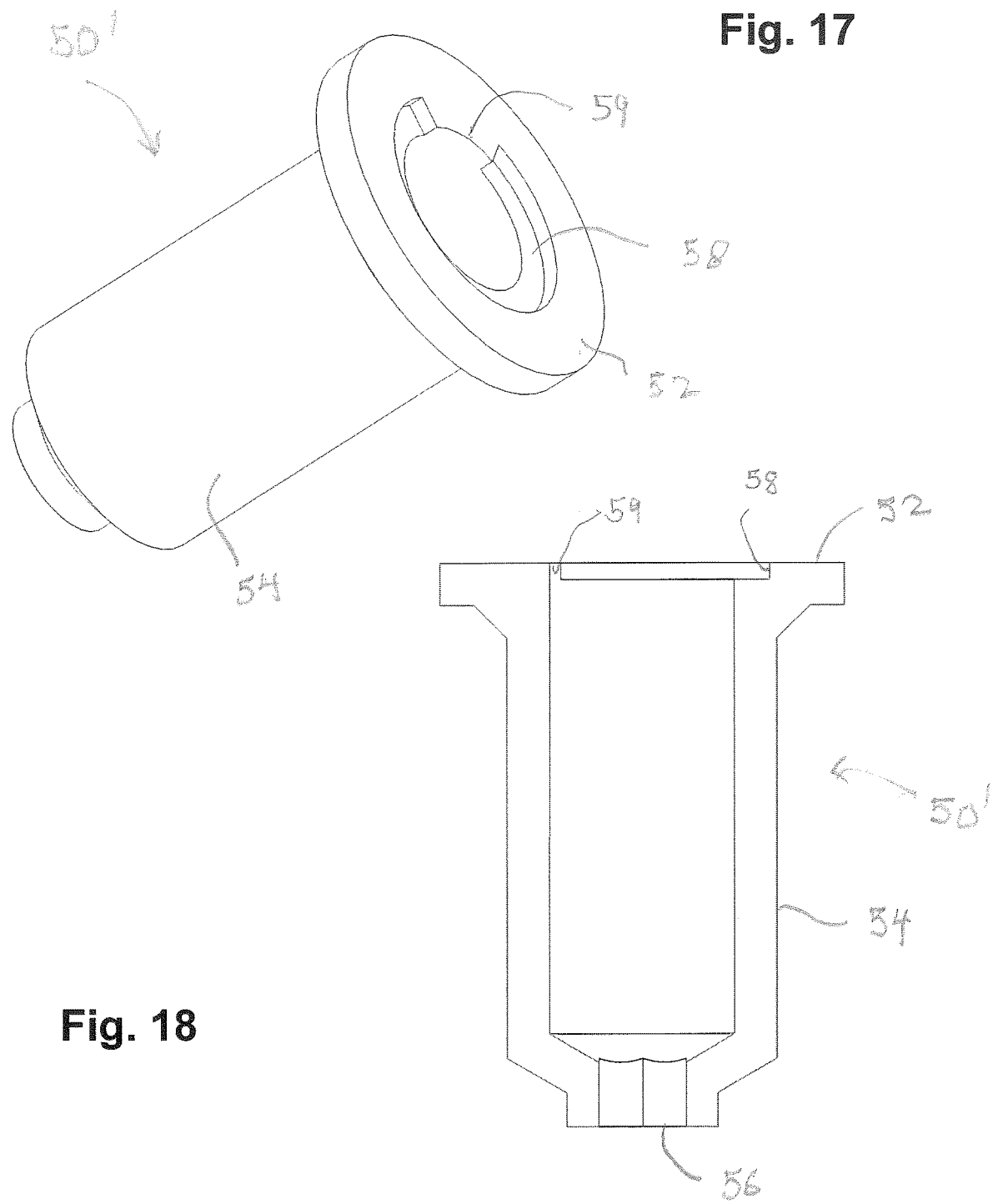
FIG. 17 is an enlarged perspective view of a second embodiment of an offset cap.
FIG. 18 is a sectional view through the offset cap of FIG. 17.

With additional reference to FIG. 9, bushing 20 is a semi-flexible plastic member having a lower quasi-annular flange 22 defining a notch 24 and a generally perpendicularly projecting semi-flexible sleeve 21. The sleeve 21 has a longitudinal slot 26 extending from the notch to the terminus of the sleeve. As shown in FIGS. 9 and 11, for example, the slot 26 defines a circumferential gap that provides a circumferential spacing 70 between a first longitudinal edge 72 and a second longitudinal edge 74 of the sleeve 21. The sleeve 21 has a cylindrical inner surface 28 interrupted by the slot 26. The sleeve 21 is configured so that it can be easily snapped over the unthreaded portion 15 of the fastener and is retained to the fastener by the flange 22 engaging the lower portion of the fastener neck/flange and the upper end 23 engaging an upper projecting portion of the reamer 16 and by the resilience of the sleeve which returns to its normal shape. The notch 24 may also facilitate capturing the fastener. Upon installation, the sleeve 21 is driven into the fastener bore of the non-load bearing member and flange 22 engages the underside surface of the non-load bearing member.

Figure 19:
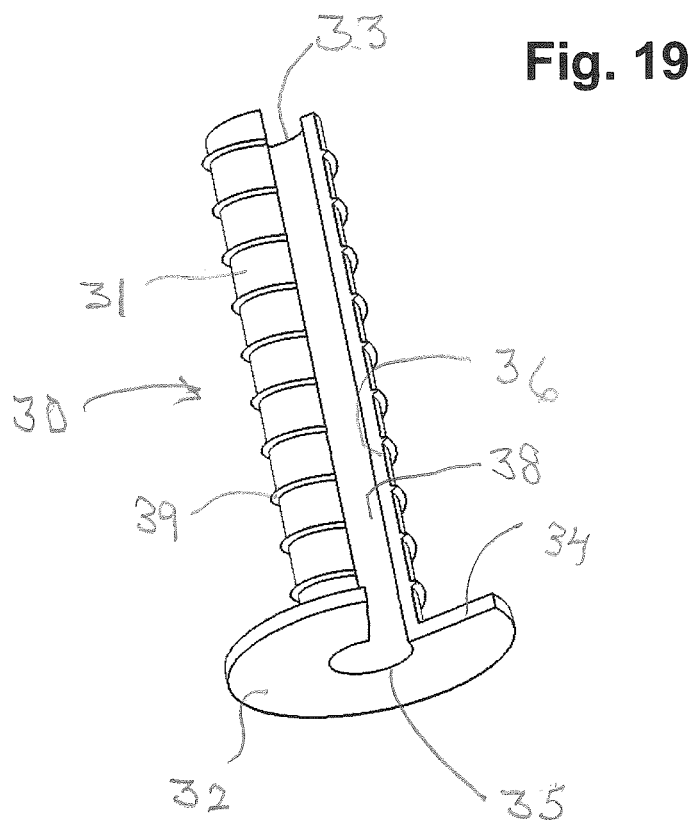
FIG. 19 is a perspective view of a second embodiment of a floating bushing.

With additional reference to FIG. 19, semi-flexible bushing 30 is similar in form and function to bushing 20 except that sleeve 31 has an exterior thread 39. Bushing 30 has a lower flange 32 with a notch 34 and sleeve 31 is traversed by a longitudinal slot 36. The inner surface 38 substantially cylindrical except for the axial slot. As shown in FIG. 19, for example, the slot 36 defines a circumferential gap that provides a circumferential spacing 70 between a first longitudinal edge 72 and a second longitudinal edge 74 of the sleeve 21. Again, bushing 30 is configured so that sleeve 31 snaps over and slides along and is rotatable about the unthreaded upper portion 15 of the fastener and is also axially slidable along with the unthreaded upper portion. Upon installation, the sleeve 31 is rotatably driven into the fastener formed bore of the non-load bearing member and flange 32 engages the underside surface of the non-load bearing member.

The offset adapter 50 functions to receive a driver bit 60 to form an attachment assembly 65 rotatably couplable with the fastener 10 captured by the receivably mounted bushing 20 or 30. With reference to FIG. 11, upon mounting the assembly 65 to a torque driver 70 and driving the attachment assembly/fastener/bushing, a pre-established proud head position of the fastener is ultimately implemented, as illustrated in FIGS. 12-16.

With additional reference to FIGS. 5-8, the offset adapter 50 comprises a bell-like enclosure or cap having a central axis A. The enclosure terminates at an annular reference flange 52 normal to and coaxial with the axis A. The enclosure has a quasi-cylindrical portion 54 which upwardly tapers to form a central axial opening 56. The opening 56 has a polygonal shape complementary to a shank portion of the driver bit. A coupling recess 58 coaxial with axis A is formed at the end of the adapter. Coupling recess 58 is complementary to the flange 22 or 32 of the bushing 20 or 30.

Figure 20:
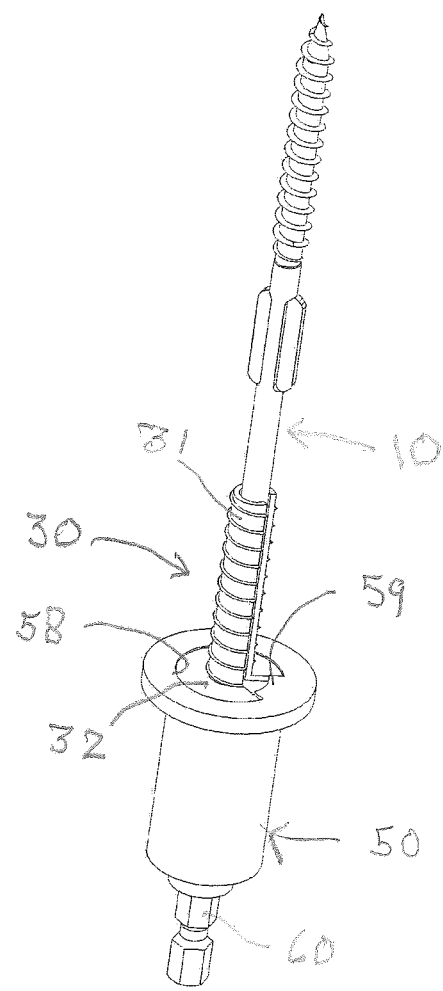
FIG. 20 is a perspective view of a floating connection assembly comprising a second embodiment of the offset cap and the floating bushing of FIG. 19.

With reference to FIGS. 19 and 20, for adapter 50', a key 59 projects radially inwardly to interrupt the recess 58. The key 59 (FIG. 20) is generally complementary with the notch 24 or 34 of the bushing flange 22 or 32 so that upon reception of the coupled flange 22 or 32 by the adapter 50', the adapter 50 and bushing 20 or 30 are rotatably locked. In some embodiments wherein the sleeve has no exterior threads (such as sleeve 21), the key is omitted and there is no rotational locking between the cap or adapter 50 and the bushing 20. Upon driving the fastener, there may be limited rotation of the bushing 20 due to friction between the flange 22 and the adapter 50.

The driver bit 60 has a socket 62 adapted to engage the hex head 12 of the fastener. Naturally, the bit/fastener head engagement may be configured differently if the fastener torque engagement portion has a different structure. The bit has a polygonal shank portion 64 of uniform polygonal cross-section is closely received in the opening 56. The bit 60 and adapter 50 are thus rotatably fixed. The bit shank axially projects from the adapter and has a proximal engagement end 66. With reference to FIG. 11, the bit shank end 66 is received by the chuck 72 of a torque driver 70 which may be of numerous conventional forms.

The driver bit is retained to the housing so that it forms an interior stop with a clearance C as indicated in FIG. 8. Because of the pre-established clearance C, when the fastener is driven, the reference flange 52 ultimately engages the underside of the header H or support member, and the fastener head is torqued to drive the fastener 10 (and sleeve) so that the flange 22 or 32 carried by the cap in coupling recess 58 ultimately engages the underside of the non-load bearing member and the head essentially sits proud relative to the non-load bearing member or is offset by clearance C.

With reference to FIGS. 12-16 the bushing 20 and captured fastener 10 are installed as a unit. Upon driving and installing the fastener 10, the bushing 20 remains mounted to the fastener, and the bushing and fastener function to provide the floating connection installation between a load bearing structure, such as a truss, and a non-load bearing structure, such as a partition or interior wall. The installation is accomplished in a one-step procedure in which the fastener 10 forms a bore B in the header H or non-load bearing member as it is driven into the load bearing member such as truss T. The sleeve 21 of the bushing is forced into the bore B during the driving step via a combination of friction from the fastener and a direct pushing force from the adapter 50. The sleeve 21 is received along with the adjacent unthreaded portion of the fastener in the fastener bore B of the non-load bearing member. Upon installation, the sleeve 21 or 31 does not extend the entire axial length of the formed bore B.

The bushing 30 rotates with the driver and adapter 50' as the fastener is driven. The exterior surface of sleeve 31 and the thread 39 frictionally engage the non-load bearing member bore B. Sleeve 31 may slightly thread or engage into the structure adjacent the non-load bearing member bore.

When installed by the embodiment of the adapter 50 (without a key like element 59 in the adapter 50'), the bushing 20, for the most part, does not rotate or only slightly rotates when the fastener is driven. Once the fastener is threaded into the load bearing member, the unthreaded portion of the fastener is slidable relative to the inner surface of the sleeve 21 or 31. The attachment assembly 65 comprising adapter 50 and driver bit 60 is disengaged from the fastener head 12 of the implemented floating connection and is reusable with multiple captured fastener/bushings for multiple subsequent floating connection installations.

For preferred embodiments, wherein the floating bushing 20 does not have an exterior thread, it is not required that the bushing rotate with the adapter. For such embodiments, the described key/notch configuration and engagement is not required.

While preferred embodiments of the foregoing floating connection fastening system have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:
1. A floating connection installation system, comprising:
an adapter comprising an offset enclosure defining a central first axis and a proximal opening with a coaxial driving bit extending therethrough at least partially into the enclosure and having a distal reference flange defining an abutment surface;

a fastener with an elongate shank extending from an enlarged head, the shank having threading on at least a portion thereof; and a bushing having a sleeve defining a second central axis mounted on the fastener coaxial thereto, and having a proximal locating flange disposed about said second central axis and a distal opening, wherein the adapter bit is engageable with the head of the fastener in a driving position, the fastener comprises a bore forming reamer and the bushing is mounted between the reamer and the head, and driving the fastener into a first building member bores a hole through the first building member and embeds the fastener into a second building member with the sleeve within the hole bored in the first building member.

2. The system of claim 1, wherein the locating flange abuts a portion of the reference flange in the driving position.

3. The system of claim 2, wherein the locating flange and reference flange are not rotationally fixed to one another in the driving position.

4. The system of claim 1, wherein the distal reference flange has a locating coupling recess configured to receive at least a portion of the locating flange in abutment with a surface thereof.

5. The system of claim 4, wherein the fastener and bushing are not rotationally fixed to one another in the driving position.

6. The assembly of claim 1, wherein the reference flange is substantially perpendicular to the first axis.

7. The assembly of claim 1, wherein the bit terminates at a distal end positioned within the enclosure to define a clearance relative to said reference flange.

8. The assembly of claim 1, wherein the fastener comprises a threaded distal portion and an unthreaded proximal portion and the bushing is aligned on the unthreaded portion.

9. The assembly of claim 1, wherein the bit is rotationally fixed relative to the reference flange.

10. The assembly of claim 1, wherein a clearance position is established by the relationship between said reference flange and said driver bit and the fastener is driven to the clearance position offset from said non-load bearing member.

11. The assembly of claim 1, wherein the fastener has an axial length defined between a proximal end and distal end, and has a threaded distal portion with an axial length that is less than half of an overall axial length of the fastener, and when the fastener is fully installed with the adapter, an outer portion of the head projects away from the locating flange.

12. A floating connection installation system, comprising:

an adapter comprising an offset enclosure defining a central first axis and a proximal opening with a coaxial driving bit extending therethrough at least partially into the enclosure and having a distal reference flange defining an abutment surface;

a fastener with an elongate shank extending from an enlarged head, the shank having threading on at least a portion thereof; and a bushing having a sleeve defining a second central axis mounted on the fastener coaxial thereto, and having a proximal locating flange disposed about said second central axis and a distal opening, wherein the adapter bit is engageable with the head of the fastener in a driving position, driving the fastener into a first building member bores a hole through the first building member and embeds the fastener into a second building member with the sleeve within the hole bored in the first building member, and the sleeve is interrupted by an axial slot extending from a distal end.

13. The assembly of claim 12, wherein the axial slot extends from the distal end to the proximal end and through the locating flange.

14. The assembly of claim 12, wherein the fastener comprises a bore forming reamer and the bushing is mounted between the reamer and head.

15. The system of claim 12, wherein the locating flange abuts a portion of the reference flange in the driving position.

16. The system of claim 12, wherein the locating flange and reference flange are not rotationally fixed to one another in the driving position.

17. The system of claim 12, wherein the distal reference flange has a locating coupling recess configured to receive at least a portion of the locating flange in abutment with a surface thereof.

18. The system of claim 17, wherein the fastener and bushing are not rotationally fixed to one another in the driving position.

19. The assembly of claim 12, wherein the bit terminates at a distal end positioned within the enclosure to define a clearance relative to said reference flange.

20. The assembly of claim 12, wherein a clearance position is established by the relationship between said reference flange and said driver bit and the fastener is driven to the clearance position offset from said non-load bearing member.

21. The assembly of claim 12, wherein the fastener has an axial length defined between a proximal end and distal end, and has a threaded distal portion with an axial length that is less than half of an overall axial length of the fastener, and when the fastener is fully installed with the adapter, an outer portion of the head projects away from the locating flange.

22. A method of installing a floating connection between a load bearing member and a non-load bearing member, comprising:

providing an adapter with a central driver bit and a distal reference surface defining an offset clearance;

engaging the driver bit with a head of a fastener, the fastener being mounted by a bushing having a sleeve; and driving the fastener with the bit and thereby forming a bore in the non-load bearing member and threading a distal portion of the fastener into a load bearing member with the sleeve of the bushing received in the bore.

23. The method of claim 22, wherein the step of driving drives the fastener to an installation position with the sleeve entirely retained in the bore of the non-load bearing member.

24. The method of claim 23, wherein the head of the fastener is spaced from the non-load bearing member by the offset clearance in the installation position.

25. The method of claim 24, wherein a proximal end of the bushing abuts a portion of the adapter when the fastener is engaged with the driver bit.

26. The method of claim 23, wherein the distal reference surface comprises a reference flange and the proximal end of the bushing comprises a locating flange, and the step of engaging engages the locating flange against a portion of the reference flange.

27. The method of claim 26, further comprising driving the fastener until the reference flange engages a surface of the non-load bearing member.

28. The method of claim 27, wherein the locating flange abuts the surface of the non-load bearing member in the installation position.

29. A method of installing a floating connection between a load bearing member and a non-load bearing member, comprising:
- providing a composite fastener with an elongate shank having threading and a distal head, and a bushing with a proximal sleeve and distal flange mounted on the shank;
- providing an installation tool with an axial bit extending through a central proximal opening in a collar, the collar extending to a proximal reference end;
- engaging the composite fastener and installation tool by engaging the head of the fastener with the bit, wherein the installation tool and fastener are rotatably locked and the bushing is rotatable relative to each of the installation tool and fastener; and
- driving the fastener through a non-load bearing member, thereby boring a hole through the non-loadbearing member and continuing driving the fastener until the proximal reference end abuts a surface of the non-load bearing member with fastener threadedly embedded into the load bearing member and the proximal sleeve within the bore.

* * * * *